US008321870B2

(12) United States Patent
Messier et al.

(10) Patent No.: US 8,321,870 B2
(45) Date of Patent: Nov. 27, 2012

(54) METHOD AND SYSTEM FOR DISTRIBUTED COMPUTATION HAVING SUB-TASK PROCESSING AND SUB-SOLUTION REDISTRIBUTION

(75) Inventors: Daniel John Messier, Niskayuna, NY (US); Joseph James Salvo, Niskayuna, NY (US); John William Carbone, Niskayuna, NY (US); Charles Burton Theurer, Niskayuna, NY (US); Li Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 336 days.

(21) Appl. No.: 12/541,285

(22) Filed: Aug. 14, 2009

(65) Prior Publication Data

US 2011/0041136 A1 Feb. 17, 2011

(51) Int. Cl.
*G06F 9/46* (2006.01)
*G06F 15/16* (2006.01)

(52) U.S. Cl. ........ 718/102; 718/101; 718/100; 709/205; 709/201

(58) Field of Classification Search ......................... None
See application file for complete search history.

(56) References Cited

U.S. PATENT DOCUMENTS

| | | |
|---|---|---|
| 6,580,981 B1 | 6/2003 | Masood et al. |
| 7,069,560 B1 * | 6/2006 | Cheyer et al. ................. 719/317 |
| 7,092,985 B2 | 8/2006 | Hubbard |
| 7,200,837 B2 | 4/2007 | Stevens |
| 7,346,341 B2 | 3/2008 | Costa-Requena et al. |
| 7,389,319 B2 | 6/2008 | Barr et al. |
| 7,418,470 B2 * | 8/2008 | Howard et al. ............... 709/201 |
| 7,469,269 B2 | 12/2008 | Klein et al. |
| 7,515,899 B1 * | 4/2009 | Carr et al. ..................... 455/403 |

(Continued)

OTHER PUBLICATIONS

Yang et al, "Definition and Application of a Comprehensive Framework for Distributed Problem Solving," Distributed artificial intelligence : architecture and modelling : First Australian Workshop on DAI, p. 1-15; Nov. 13, 1995.*

(Continued)

*Primary Examiner* — Meng An
*Assistant Examiner* — Bing Zhao
(74) *Attorney, Agent, or Firm* — Scott J. Asmus

(57) ABSTRACT

A system for processing a computational task is presented. The system includes a plurality of nodes operationally coupled to one another via one or more networks. The plurality of nodes includes a base node including a processing subsystem configured to receive the computational task, select a subset of available nodes from the plurality of nodes based upon a present status, processing capability, distance, network throughput, range, resources, features, or combinations thereof of the plurality of nodes, divide the computational task into a plurality of sub-tasks, distribute the plurality of sub-tasks among the subset of available nodes based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, the current load on the subset of available nodes, domain of the plurality of sub-tasks, or combinations thereof, receive sub-solutions corresponding to the plurality of sub-tasks from the subset of available nodes in a desired time period, and reassemble the sub-solutions to determine a solution corresponding to the computational task.

19 Claims, 4 Drawing Sheets

U.S. PATENT DOCUMENTS

| | | | |
|---|---|---|---|
| 7,624,118 B2 * | 11/2009 | Schipunov et al. | 707/999.004 |
| 2005/0114862 A1 | 5/2005 | Bisdikian et al. | |
| 2009/0182814 A1 * | 7/2009 | Tapolcai et al. | 709/205 |

OTHER PUBLICATIONS

David P. Anderson et. al, "SETI@home: An Experiment in Public-Resource Computing," Communications of the ACM; Nov. 11, 2002.*

Csaji et al, "Adaptive Algorithms in Distributed Resource Allocation;" Adaptive Algorithms in Distributed Resource Allocation, Proceedings of the 6th International Workshop, p. 69-75; Aug. 19, 2006.*

George et al., "Self-Organized Inference of Spatial Structure in Randomly Deployed Sensor Networks," University of Cincinnati and Ohio; 2006.*

Smith et al., "Programming High Performance Reconfigurable Computers;" The University of Tennessee, Department of Electrical and Computer Engineering; 2004.*

Mullen et al, "Customer-Driven Sensor Management," IEEE Intelligent Sytems, pp. 41-49, Mar.-Apr. 2009.*

Chatschik Bisdikian, Isaac Boamah, Paul Castro, Archan Misra, Jim Rubas, Nicolas Villoutreix, Danny Yeh, Vladimir Rasin, Henry Huang, Craig Simonds; "Intelligent Pervasive Middleware for Context-Based and Localized Telematics Services"; 10 Pages, Sep. 28, 2002.

Boon Thau Loo, Anthony LaMarca, Gaetano Borriello; "Peer-To-Peer Backup for Personal Area Networks"; Department of Computer & Information Science Departmental Papers (CIS) IRS-TR-02-015; May 2003; 10 Pages.

Brian Delaney, Tajana Simunic, Nikil Jayant; "Energy Aware Distributed Speech Recognition for Wireless Mobile Devices"; Name and Date: Mobile and Media Systems Laboratory HP Laboratories Palo Alto HPL-2004-106, Jun. 17, 2004;18 Pages.

* cited by examiner

METHOD AND SYSTEM FOR DISTRIBUTED COMPUTATION HAVING SUB-TASK PROCESSING AND SUB-SOLUTION REDISTRIBUTION

BACKGROUND

The invention relates generally to methods and systems for distributed computing, and more particularly to methods and systems for distributed computing in telematics devices.

Distributed computing is a field of technology where a computational task is divided into a plurality of sub-tasks. Further, the plurality of sub-tasks are distributed among a plurality of computing devices such that one or more of the plurality of sub-tasks are processed in parallel to determine sub-solutions corresponding to the plurality of sub-tasks. The parallel processing of one or more of the plurality of sub-tasks is typically followed by combining the sub-solutions to generate a solution of the computational task.

Furthermore, telemetry, synonymous with telematics, is a technology that facilitates remote measurement and reporting of information of interest to a system designer or operator. Moreover, telematics entails an integrated usage of telecommunications and informatics, also known as ICT (Information and Communications Technology). More specifically, telematics is a science of sending, receiving and storing information via telecommunication devices. Recently, telematics has been applied in global positioning system technology (GPS) where the GPS technology is integrated with computers and mobile communications technology in automotive navigation systems. Accordingly, while the term "telemetry" has most narrowly evolved to refer to the use of telematics systems in road vehicles, the telematics industry is not limited to automotive applications. Other applications of telematics systems are also being studied and developed for monitoring water and air pollution, for medical informatics and healthcare, and for distance learning.

Telematics systems are often limited in computational power and available bandwidth. Since telematics systems are either installed at factories, or are purchased off the shelf, and are rarely upgraded, the computational capability of these telematics devices is limited by their initial computational capability. Also, while normal computing systems have enough power resources that allow the computing systems to operate continuously, a few telematics systems include an internal battery, or an external power resource potentially limiting the operation of the telematics devices. Moreover, external power resources may not be readily available to telematics systems at all places to perform processor-intensive computational tasks that require substantive power and time. Also, telematics devices are expected to process intensive computational tasks including video data, audio data, and the like, it is imperative to use high end processing telematics devices.

Further, while normal distributed computing devices may have enough power resources and intensive computational capability, the normal distributed computing devices may be constrained by a limited number of communication channels or communication modes available for communicating with other computing devices or computing resources. However, telematics devices use varied number of communication channels or communication modes for communicating with other computing devices, computing resources or other telematics devices. The communication modes, for example, may include, a Bluetooth, a satellite network, a cellular network, a private network, Wi-Fi, and other communication modes.

It is therefore desirable to have a blend of distributed computing and telematics systems to enable parallel execution of the plurality of sub-tasks, thereby resulting in optimized and distributed power and processing capabilities of the telematics systems. More particularly, it is desirable to develop distributed computing systems and methods configured to process a computationally intensive task by distributing a plurality of sub-tasks corresponding to the computationally intensive task among a plurality of telematics devices, while understanding the speed and cost tradeoffs associated with the plurality of telematics devices.

BRIEF DESCRIPTION

Briefly in accordance with one aspect of the technique, a system for processing a computational task is presented. The system includes a plurality of nodes operationally coupled to one another via one or more networks. The plurality of nodes includes a base node including a processing subsystem configured to receive the computational task, select a subset of available nodes from the plurality of nodes based upon a present status, processing capability, distance, network throughput, range, resources, features, or combinations thereof of the plurality of nodes, divide the computational task into a plurality of sub-tasks, distribute the plurality of sub-tasks among the subset of available nodes based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, the current load on the subset of available nodes, domain of the plurality of sub-tasks, or combinations thereof, receive sub-solutions corresponding to the plurality of sub-tasks from the subset of available nodes within a desired time period, and reassemble the sub-solutions to determine a solution corresponding to the computational task.

In accordance with another aspect of the present technique, a system for processing a computational task is presented. The system includes a plurality of telematics devices operationally coupled to one another via one or more networks. The plurality of telematics devices includes a base node including a processing subsystem configured to receive the computational task, select a subset of available telematics devices from the plurality of telematics devices based upon a present status, processing capability, distance, network throughput, range, resources, features, or combinations thereof of the plurality of telematics devices, divide the computational task into a plurality of sub-tasks, distribute the plurality of sub-tasks among the subset of available telematics devices based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, current load on the subset of available nodes, domain of the plurality of sub-tasks, or combinations thereof, receive sub-solutions corresponding to the plurality of sub-tasks from the subset of available telematics devices within a desired time period, and reassemble the sub-solutions to determine a solution corresponding to the computational task.

In accordance with still another embodiment of the present technique, a method for processing a computational task is presented. The method includes selecting a subset of available nodes from a plurality of nodes by determining a present status, processing capability, distance, network throughput, range, resources, features, and combinations thereof of the plurality of nodes, dividing the computational task into a plurality of sub-tasks, distributing the plurality of sub-tasks among the subset of available nodes based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, current load on the subset of available nodes, domain of the plurality of sub-tasks, or combinations thereof, receiving sub-solutions corresponding to the plurality of sub-tasks from the subset of available nodes within a desired time period, and reassembling the sub-solutions to determine a solution corresponding to the computational task.

In accordance with yet another embodiment of the present technique, a method for processing a computational task is presented. The method includes selecting a subset of available nodes by determining a present status of a plurality of nodes, dividing the computational task into a plurality of sub-tasks, distributing the plurality of sub-tasks among the subset of available nodes based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, current load on the subset of available nodes, domain of the plurality of sub-tasks, or combinations thereof, receiving sub-solutions of one or more of the plurality of sub-tasks from one or more of the subset of available nodes in a desired time period, verifying receipt of sub-solutions within the desired time period to determine existence of one or more unprocessed sub-tasks, redistributing the one or more unprocessed sub-tasks to new nodes, receiving sub-solutions corresponding to the one or more unprocessed sub-tasks within the desired time period, and reassembling the sub-solutions to determine a solution corresponding to the computational task.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
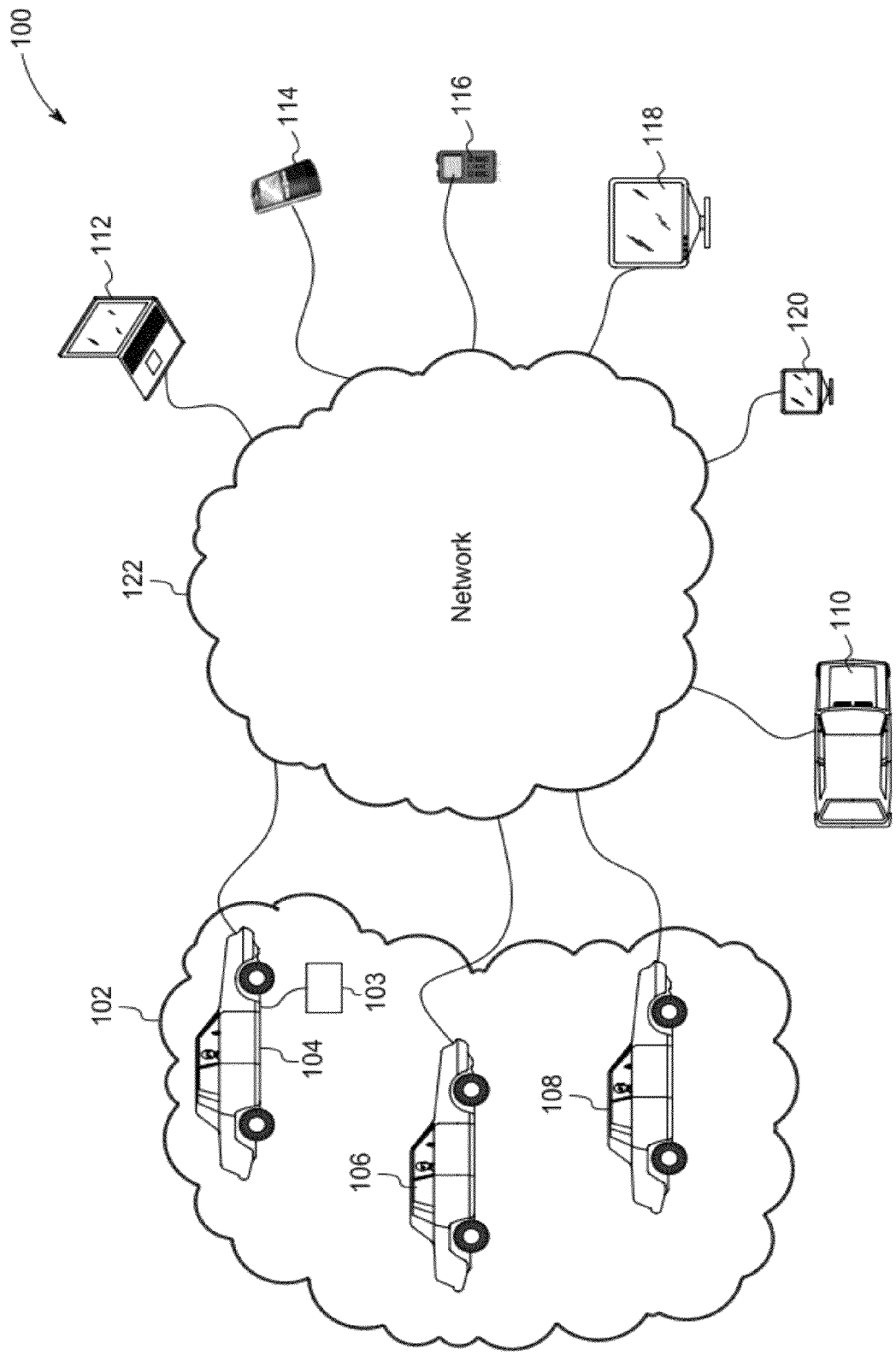
FIG. 1 is a diagrammatical illustration of an exemplary distributed computing system for processing a computational task resulting in a solution, in accordance with aspects of the present technique.

FIG. 1 is a diagrammatical illustration of an exemplary distributed computing system 100 for processing a computational task, in accordance with aspects of the present technique. By way of a non-limiting example, the computational task may include facial recognition tasks, voice recognition tasks, traffic management tasks, routing tasks, video processing tasks, image processing tasks, vehicle management subsystem tasks, gaming and entertainment tasks, messaging tasks, signal processing tasks, tasks for analyzing large sets of data, and the like. In certain embodiments, the system 100 may be configured to process a computational task to obtain a desired solution. More particularly, the system 100 may be configured to divide the computational task into a plurality of sub-tasks. In one embodiment, the MapReduce and/or the Berkeley Open Infrastructure for Network Computing (BOINC) middleware may be used by the system 100 to divide the computational task into the plurality of sub-tasks. Additionally, the system 100 may also be configured to process one or more of the plurality of sub-tasks in parallel to determine sub-solutions corresponding to the plurality of sub-tasks followed by a combination of the sub-solutions, thereby generating the desired solution corresponding to the computational task. In accordance with exemplary aspects of the present technique, the processing of the computational task to determine the solution will be described in greater detail with reference to FIGS. 2-4. More particularly, the division of the computational task into the plurality of sub-tasks and the processing of the one or more of the plurality of sub-tasks in parallel to determine the sub-solutions will be described in greater detail with reference to FIGS. 2-4.

Furthermore, in one embodiment, the system 100 may include a plurality of nodes. The plurality of nodes, for example, may be configured to divide the computational task into the plurality of sub-tasks. In certain embodiments, the plurality of nodes may also be configured to process one or more of the plurality of sub-tasks in parallel to determine sub-solutions corresponding to the plurality of sub-tasks followed by the combination of the sub-solutions, thereby generating the solution corresponding to the computational task. The plurality of nodes, for example, may include peer devices and/or non-peer devices. As used herein, the term "peer devices" may be used to refer to devices having mobile capability, devices affixed to telematics devices, telematics devices, or combinations thereof. Further, as used herein, the term "non-peer devices" may be used to refer to devices having limited or no mobile capability. In an exemplary embodiment, the peer devices may include telematics devices affixed to a vehicle, or other mobile devices with processing power such as a cell phone, a laptop, and the like. Similarly, the non-peer devices may include a computer, a server, a desktop, non-telematics devices or other similar computing devices.

In addition, the system 100 may include the plurality of nodes, wherein the plurality of nodes includes peer devices and/or non-peer devices. As illustrated in the presently contemplated configuration of FIG. 1, the peer devices may include cars 104, 106, 108, 110, a laptop 112, a mobile 114 and a personal digital assistant (PDA) 116. 110. Further, the non-peer devices may include desktops 118, 120.

Moreover, in certain embodiments, the plurality of nodes 104, 106, 108, 110, 112, 114, 116, 118, 120 maybe operationally coupled with one another via a network 122. In one embodiment, the network 122, for example, may include one or more networks (not shown). Further, the network 122 may include a satellite network, a local area network, a wide area network, a private network, a wired network, a wireless network, and the like. Additionally, as illustrated in a presently contemplated configuration, the cars 104, 106, 108 may be connected to one another via a private network 102. It should be noted, that while in the presently contemplated configuration, the private network 102 includes only the peer devices, such as, the cars 104, 106, 108, in certain embodiments, a private network, such as, the private network 102, may also include non-peer devices. Further, in certain embodiments, the plurality of nodes 104, 106, 108, 110, 112, 114, 116, 118, 120 may communicate with one another using one or more communicating modes in the networks 102, 122. The communicating modes, for example, may include a Global System for Mobile Communications method (GSM), a General Packet Radio Service method (GPRS), Bluetooth, a Worldwide Interoperability for Microwave Access method (Wi-Max), Wi-Fi, 802.15.4 (Zigbee or similar), and the like. For example, a node in the plurality of nodes 104, 106, 108, 110, 112, 114, 116, 118, 120 may communicate with certain nodes in the networks 102, 122 via Wi-Fi using the GPRS method to communicate with other nodes in the networks 102, 122.

Furthermore, in accordance with aspects of the present technique, one or more of the plurality of nodes 104, 106, 108, 110, 112, 114, 116, 118, 120 may be configured to process one or more computational tasks or the plurality of sub-tasks corresponding to the computational tasks to determine a solution. The processing of the one or more computational tasks or the plurality of sub-tasks will be described in greater detail with reference to FIGS. 2-4.

Figure 2:
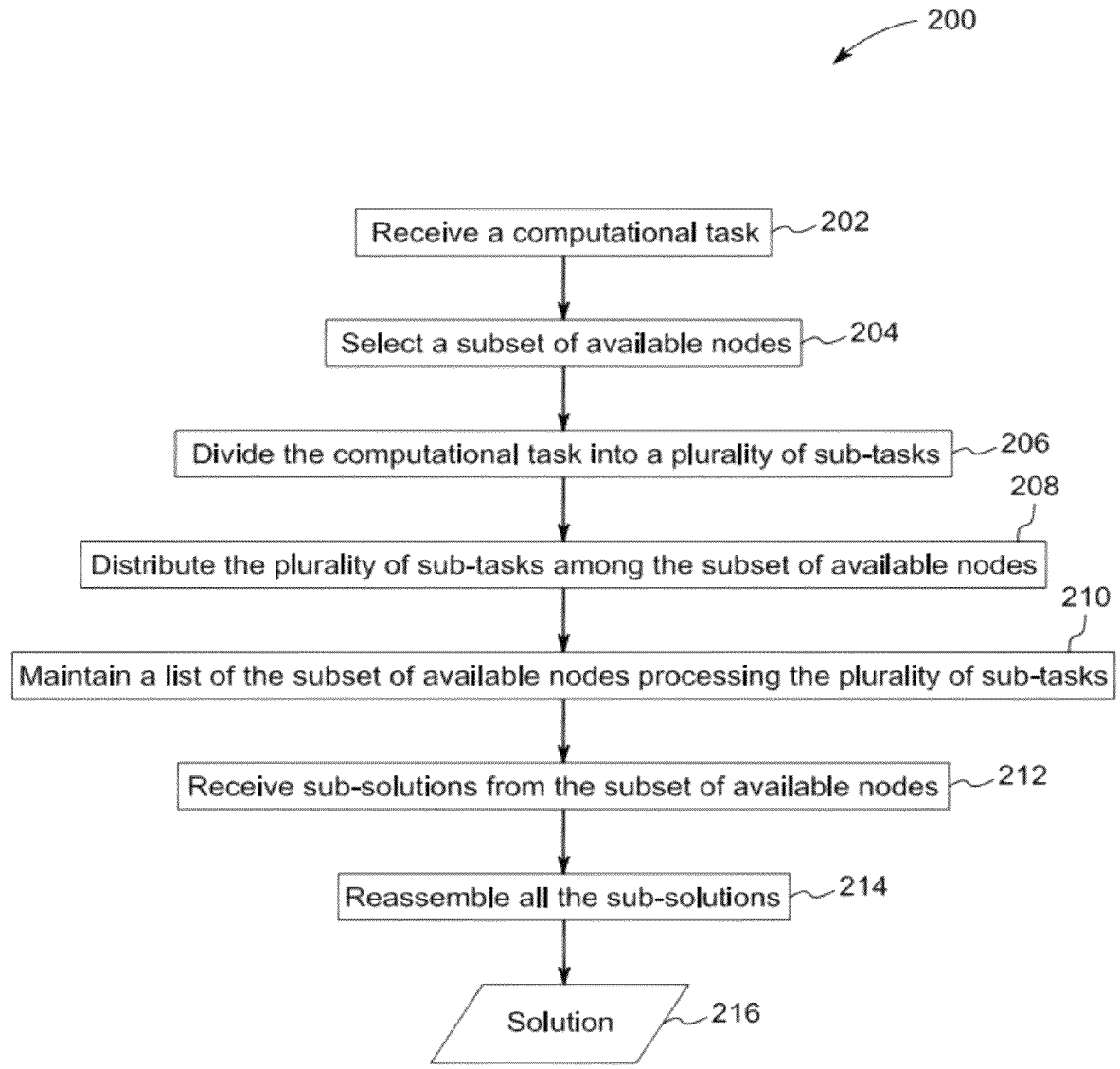
FIG. 2 is a flow chart illustrating an exemplary method for processing a computational task, in accordance with aspects of the present technique.

Referring now to FIG. 2, a flow chart 200 illustrating an exemplary method for processing a computational task, in accordance with aspects of the present technique, is depicted. More particularly, the method includes selecting a subset of available nodes from a plurality of nodes based upon a current status, processing capability, distance, network throughput, range, resources, features, or combinations thereof of the plurality of nodes. The method further includes dividing the computational task into a plurality of sub-tasks followed by distributing the plurality of sub-tasks among the subset of available nodes. The plurality of sub-tasks may then be processed by the subset of available nodes to generate sub-solutions corresponding to the plurality of sub-tasks. The determination of the sub-solutions may be followed by rearrangement of the sub-solutions to determine a solution corresponding to the computational task. The method starts at step 202, where the computational task may be received. In one embodiment, a base node may receive the computational task. It may be noted that the term "base node" is used to refer to a node that receives the computational task. By way of example, in an exemplary embodiment, the base node may be a peer device, such as, any one of the cars 104, 106, 108, 110, the laptop 112, the mobile 114, and the personal digital assistant 116 (see FIG. 1). In certain embodiments, the base node may include a non-peer device, such as the desktops 118, 120 (see FIG. 1). In one embodiment, the base node may include the peer device 104.

Furthermore, a subset of available nodes may be selected, as indicated by the step 204. In one embodiment, the subset of available nodes may be selected from the plurality of nodes in the distributed computing system 100 (see FIG. 1). Specifically, in one embodiment, the subset of available nodes may be selected from available nodes. As used herein, the term "available nodes" may be used to refer to nodes that are available for processing a plurality of sub-tasks corresponding to the computational task. In one embodiment, the available nodes may also include the base node, such as the base node (peer device) 104. The availability of a node, for example, may be dependent on a processing capability of the node, present status of the node, distance of the node from the base node, network throughput of the node, range of the node, health of the node, trajectory of the node (entering/leaving range-limited communications), trust in the base node, the fact that the node is stationary/moving, the current load on the node, grouping of the node with the base node (friend/foe), security policy of the node, or combinations thereof.

It may be noted that in certain embodiments, the base node 104 may determine the available nodes. More particularly, a processing subsystem 103 in the base node 104 may be used to determine the available nodes. It should be noted that while in the presently contemplated technique, the base node 104 includes the processing subsystem 103, in certain embodiments, one or more nodes in the plurality of nodes may include a corresponding processing subsystem. In one embodiment, the base node 104 and more particularly, the processing subsystem 103 in the base node 104 may be configured to determine the available nodes by broadcasting a signal to the plurality of nodes in a determined range. In one embodiment, the signals may be broadcast via one or more communication modes, such as, a GSM method, a GPRS method, Bluetooth, a Wi-Max method, Wi-Fi, 802.15.4 (Zigbee or similar), and the like. The signal, for example, may be broadcast by the base node 104 to the nodes in the plurality of nodes 106, 108, 110, 112, 114, 116, 118, 120 (see FIG. 1). Further, in one embodiment, the signal may include queries related to details of the plurality of nodes, such as, processing capability, status, distance, network throughput, range, and the like. Additionally, availability of one or more nodes in the plurality of nodes may be determined by the base node 104 based upon responses to the broadcast signal received from the plurality of nodes 106, 108, 110, 112, 114, 116, 118 and 120. Also, in one embodiment, the availability of one or nodes in the plurality of nodes may be determined based upon the response time consumed by the one or more nodes in responding to the broadcast signal. In other words, responses to the broadcast signal leads to determination of the available nodes. In such an embodiment, the available nodes may include nodes that are present inside and around the determined range. In another embodiment, the available nodes may be determined by sending a request to a central server having information regarding the plurality of nodes. The information, for example, may include location, processing capability, storage capacity, status, speed, reliability, cost tradeoffs, network throughput, range, present status, distance, health, trajectory (entering/leaving range-limited communications), trust, the fact that the node is stationary/moving, current load, grouping of the plurality of nodes with the base node (friend/foe), security policy, and the like of the plurality of nodes.

Consequent to the determination of available nodes, the subset of available nodes may be selected from the available nodes. In certain embodiments, the base node 104 may select the subset of available nodes. The subset of available nodes, for example, may include nodes that are capable of processing one or more sub-tasks of the plurality of sub-tasks. The subset of available nodes may also include nodes that have spare resources to process the one or more sub-tasks of the plurality of sub-tasks. Furthermore, the subset of available nodes may be determined by comparing maximum/minimum completion time allowed for completion of the plurality of sub-tasks, resources required for completion of the plurality of sub-tasks, and other requirements for completion of the plurality of sub-tasks against processing power of the available nodes and resources of the available nodes.

In addition, the computational task may be divided into a plurality of sub-tasks, as indicated by step 206. In accordance with aspects of the present technique, the computational task may be divided into the plurality of sub-tasks based upon the nature of the computational task, a number of nodes in the subset of available nodes, size of the computational task, type of the computational task, domain of the computational task, completion time period allowed for completion of the computational task, level of security required for the completion of the computational task, and the like. In one embodiment, the computational task may be divided by the MapReduce and/or the Berkeley Open Infrastructure for Network Computing (BOINC) middleware. Further, in one embodiment, the computational task may be divided into the plurality of sub-tasks by the base node 104. For example, the computational task may be divided into the plurality of sub-tasks by a peer device that receives the computational task. As previously noted with reference to FIG. 1, the peer device may include any one of the cars 104, 106, 108, 110, the laptop 112, the mobile 114, and the personal digital assistant 116. It should be noted that while the present technique entails the division of the computational task into the plurality of sub-tasks, in one embodiment, the computational task may not be divided into the plurality of sub-tasks. In such an embodiment, the computational task may be processed by the base node, a node of the subset of available nodes or available nodes.

Subsequently, the plurality of sub-tasks may be distributed among the subset of available nodes, as indicated by step 208. In other words, the plurality of sub-tasks may be allocated to the subset of available nodes. It may be noted that the distribution of the plurality of sub-tasks among the subset of available nodes enables parallel processing of the plurality of sub-tasks. The plurality of sub-tasks, for example, may be distributed and allocated to the subset of available nodes based upon a number of nodes in the subset of available nodes, completion time period allowed for the plurality of sub-tasks, a distribution criteria, level of security required for the completion of the plurality of sub-tasks, resources available with the subset of available nodes, processing capability of the subset of available nodes, range of the subset of available nodes, features in the subset of available nodes, reliability of the subset of available nodes, trust in the subset of available nodes, the current load on the subset of available nodes, domain of the plurality of sub-tasks, or combinations thereof. In an exemplary embodiment, the base node 104 may retain one or more of the plurality of sub-tasks while distributing and allocating other sub-tasks of the plurality of sub-tasks. In one embodiment, an input and libraries required for processing or completion of one or more of the plurality of sub-tasks may be distributed to the corresponding one more of the subset of available nodes.

Additionally, in certain embodiments, multiple sub-tasks of the plurality of sub-tasks may be allocated to a single node in the subset of available nodes. Furthermore, in other embodiments, a sub-task of the plurality of sub-tasks may be allocated to multiple nodes in the subset of available nodes. In one embodiment, the allocation of a sub-task of the plurality of sub-tasks to multiple nodes in the subset of available nodes facilitates compensation of unreliable nodes in the subset of available nodes. For example, a sub-task S may be allocated to two or more nodes in the subset of available nodes to increase a probability of receiving a sub-solution corresponding to the sub-task S within a desired time period from at least one of the two or more nodes in the subset of available nodes. Similarly, in another embodiment, the sub-task S may be allocated to one unreliable node in the subset of available nodes and one node in the subset of available nodes that is at a substantial distance from the base node 104, thereby increasing chances of receiving a sub-solution corresponding to the sub-task S in the desired time period. In yet another embodiment, the plurality of sub-tasks may be distributed and allocated among nodes in the subset of available nodes depending on cost of utilization of resources by each node in the subset of available nodes. For example, a node in the subset of available nodes that uses a satellite for communicating may be relatively more expensive in comparison to another node in the subset of available nodes that uses a remote server for communicating. Similarly, a node in the subset of available nodes that uses a remote server for communicating may be relatively more expensive in comparison to a node in the subset of available nodes that uses Bluetooth for communicating. Furthermore, in certain embodiments, the plurality of sub-tasks may be distributed and allocated in an optimized way by determining tradeoffs between various features of the nodes in the subset of available nodes, such as a cost of using a node and speed of a node. For instance, a cost of using a node A that uses satellite communication may be relatively more than a cost of using another node B that uses a remote server, however, node A will require a relatively shorter time period for communication in comparison to a time period required by node B for communication.

Subsequently, at step 210, a list of nodes in the subset of available nodes having one or more sub-tasks allocated for processing may be generated and maintained. The list, for example, may include details of the plurality of sub-tasks mapped against their respective nodes in the subset of available nodes. By way of example, if a sub-task S' is assigned to node C, and another sub-task S" is assigned to a node D, then the list generated at step 210 is configured to maintain a listing of the sub-tasks S,' S" and the nodes C, D, they are assigned to.

In addition, once the plurality of sub-tasks are assigned to the subset of available nodes, in accordance with aspects of the present technique, sub-solutions corresponding to the plurality of the sub-tasks may be received, as indicated by step 212. More particularly, in one embodiment, the base node 104 may be configured to receive the sub-solutions associated with the plurality of sub-tasks from the corresponding nodes. The sub-solutions, for example, may be received from the subset of available nodes. The receipt of sub-solutions from the subset of available nodes may be better understood with reference to FIG. 3.

Figure 3:
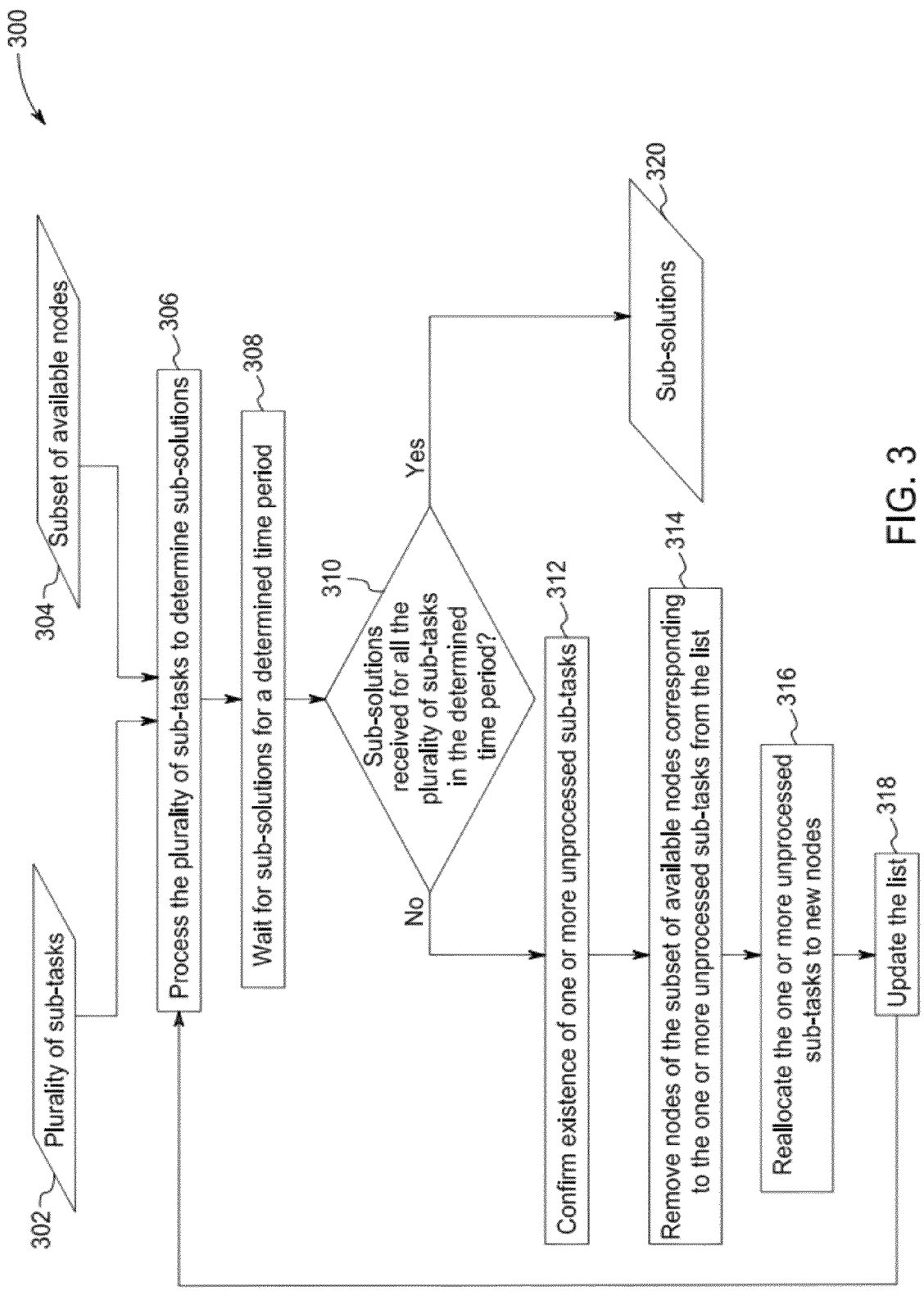
FIG. 3 is a flow chart illustrating an exemplary method for receiving sub-solutions, in accordance with aspects of the present technique.

Turning now to FIG. 3, a flow chart 300 illustrating an exemplary method for receiving sub-solutions, in accordance with aspects of the present technique, is depicted. In other words, step 212 of FIG. 2 is presented in greater detail in FIG. 3. Reference numeral 302 may be representative of a plurality of sub-tasks, while reference numeral 304 may be representative of a subset of available nodes. In one embodiment, the plurality of sub-tasks 302 may include the plurality of sub-tasks that were generated by dividing the computational task, as indicated by step 206 of FIG. 2. Similarly, the subset of available nodes 304 may include the subset of available nodes determined at step 204 of FIG. 2.

The method starts at step 306, where the plurality of sub-tasks 302 may be processed to determine sub-solutions corresponding to the plurality of sub-tasks 302. The plurality of sub-tasks 302, for example, may be processed by the respective nodes in the subset of available nodes 304. Although the present technique described the plurality of sub-tasks as being processed by the respective nodes, in certain embodiments, the respective nodes may be further configured to determine a new subset of available nodes, divide their corresponding one or more sub-tasks into a new plurality of sub-tasks, followed by distribution and allocation of the new plurality of sub-tasks among the new subset of available nodes. Additionally, in certain embodiments, the respective nodes may communicate their one or more sub-tasks to the new subset of available nodes.

Moreover, the base node may be configured to wait for a determined time period to receive sub-solutions corresponding to the plurality of sub-tasks 302 from the respective nodes in the subset of available nodes 304, as indicated by step 308. In one embodiment, the determined time period may vary for each of the plurality of sub-tasks 302. Alternatively, in another embodiment, the determined time period may be the same for all of the plurality of sub-tasks 302. Furthermore, in certain other embodiments, the determined time period may be dependent on a minimum or a maximum processing time period required for completion of a sub-task of the plurality of sub-tasks 302. Also, in other embodiments, the determined time period may be dependent on a processing capability, storage capacity, status, speed, reliability, network throughput, and range of a node in the subset of available nodes 304 that have been allocated a sub-task from the plurality of sub-tasks 302.

Subsequently, at step 310, a check may be carried out to verify if sub-solutions corresponding to all of the plurality of sub-tasks 302 have been received by the base node. In other words, a check is carried out to determine if there exists one or more sub-tasks that have not been processed by their respective nodes within the determined wait time period. At step 310, if it is verified that the sub-solutions of all the plurality of sub-tasks 302 have been received, then determination of sub-solutions corresponding to all of the plurality of sub-tasks 302 may be confirmed, thereby resulting in sub-solutions 320. However, at step 310, if it is verified that sub-solutions corresponding to all of the plurality of sub-tasks 302 have not been received in the determined time period, then existence of one or more unprocessed sub-tasks may confirmed as indicated by step 312. Additionally, the nodes in the subset of available nodes corresponding to the one or more unprocessed sub-tasks may be deleted from a list of subset of available nodes that are processing the plurality of sub-tasks, as depicted by step 314. In one embodiment, this list may include the list generated at step 210 of FIG. 2. It should be noted that while in the present technique, the nodes in the subset of available nodes corresponding to the one or more unprocessed sub-tasks are deleted from the list of subset of available nodes that are processing the plurality of sub-tasks, in certain embodiments, the base node may contact the respective nodes to determine status of the one or more unprocessed sub-tasks.

Subsequently, at step 316, the one or more unprocessed sub-tasks may be reallocated to new nodes. In certain embodiments, the one or more unprocessed sub-tasks may be reallocated to the new nodes by the base node. The new nodes, for example, may be selected from the subset of available nodes that have not been deleted from the list of subset of available nodes that are processing the plurality of sub-tasks, the plurality of nodes, or the available nodes. In certain embodiments, the base node may determine the new nodes using a process that is substantially similar to the process of step 204 of FIG. 2. Furthermore, at step 318, the list of subset of available nodes that are processing the plurality of sub-tasks may be updated by including the new nodes in the list. As previously noted, the list, for example, may be updated by including details of the one or more unprocessed sub-tasks mapped to their respective new nodes. Subsequent to the updation of the list at step 318, control may be transferred to step 306, where the one or more unprocessed sub-tasks may be processed and accordingly steps 306-310 may be repeated until all the sub-solutions 320 are obtained.

With returning reference to FIG. 2, the sub-solutions received at step 212, may be reassembled in a determined order or using a determined process, as indicated by step 214. The sub-solutions received at step 212, for example, may include the sub-solutions 320 (see FIG. 3). Further, in certain embodiments, the determined order and the determined process may be dependent on the nature of the computational task. Consequent to the reassembling of the sub-solutions at step 214, a solution 216 corresponding to the computational task is determined.

Figure 4:
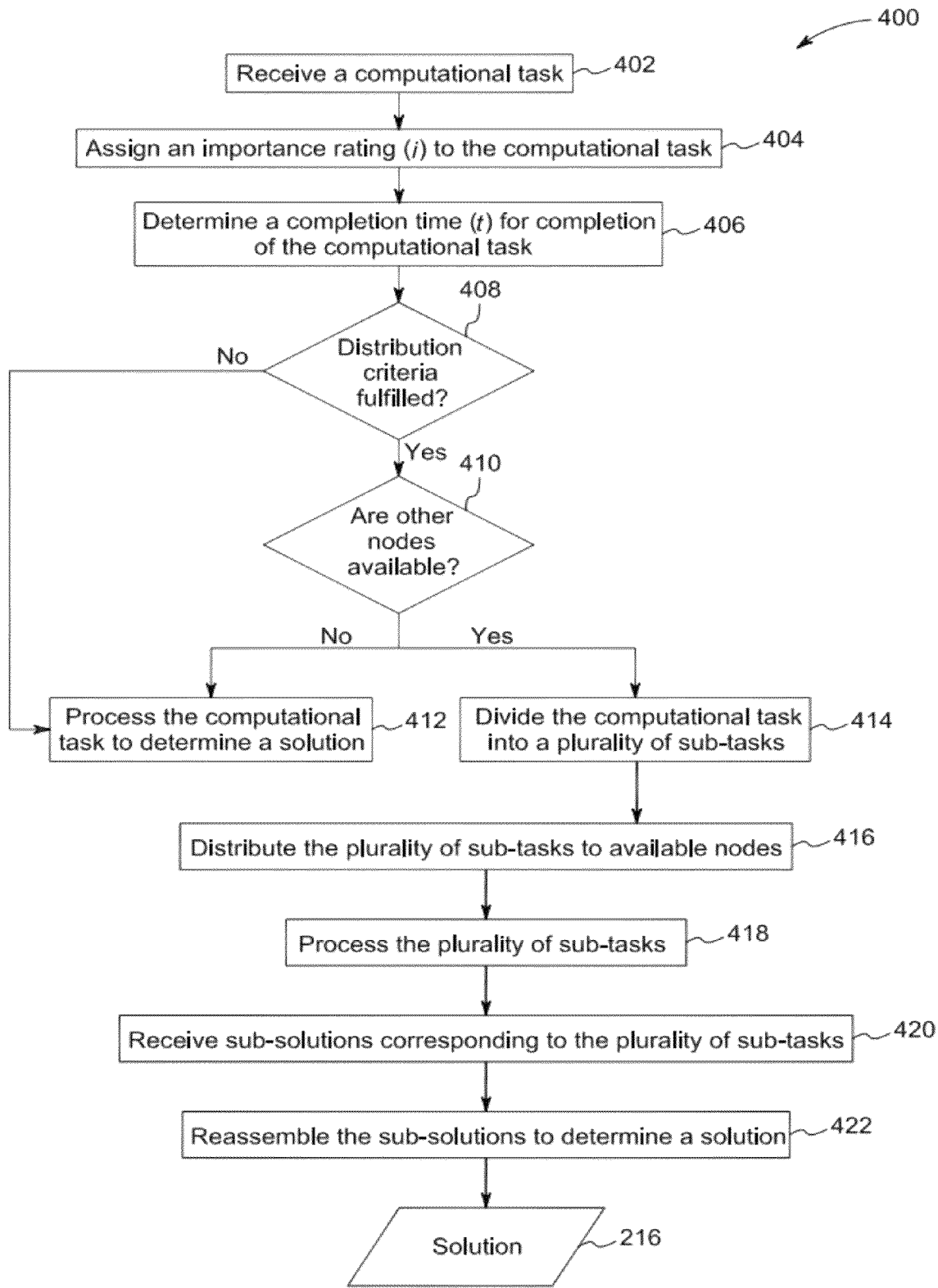
FIG. 4 is a flow chart illustrating another method for processing a computational task, in accordance with aspects of the present technique.

Referring now to FIG. 4, a flow chart 400 of another method for processing a computational task, in accordance with aspects of the present technique, is depicted. The method starts at step 402, where a computational task may be received. The computational task, for example, may be received by a base node. As previously noted, the term "base node" is used to refer to a node that receives the computational task. Subsequent to receiving the computational task, an importance rating i may be assigned to the computational task, as indicated by step 404. The importance rating i, for example, may be dependent on a criticality of the computational task. For instance, a computational task related to a car engine control system may be more critical and may have a hard deadline in comparison to a computational task related to a voice recognition system. Thus, the car engine control system related computational task may be assigned a higher importance rating than the voice recognition system related computational task.

Subsequent to the assignment of the importance rating i, a completion time t for completion of the computational task may be determined, as depicted by step 406. The completion time t, for example, may include a maximum completion time period that may be allowed for completion of the computational task. However, in one embodiment, the completion time t may include a minimum time period required for completion of the computational task.

Furthermore, at step 408, a check may be carried out to verify if a distribution criteria for distribution of the computational task is satisfied. More particularly, at step 408, a basis for dividing the computational task into a plurality of sub-tasks for distribution of the plurality of sub-tasks among other nodes may be determined. In other words, the distribution criteria may be satisfied to enable division of the computational task into the plurality of sub-tasks. The distribution criteria, for example, may include the completion time t of the computational task, criticality of the computational task, the importance rating i, expected number of resources required for processing of the computational task, and the like. By way of an example, a computational task C' may not have a desired importance rating to enable division of the computational task C' into the plurality of sub-tasks. In another exemplary embodiment, an expected number of resources required for processing of the computational task v may not be higher than a desired expected number resources to enable division of the computational task C' into the plurality of sub-tasks.

Referring again to step 408, if it is verified that the distribution criteria is not satisfied, then control may be transferred to step 412, where the computational task may be processed by a node in the plurality of nodes to determine a solution. In one embodiment, the computational task may be processed by the base node. In another embodiment, the computational task may be transferred to a node in the plurality of nodes for processing, thereby resulting in determination of the solution. However, at step 408, if it is verified that the distribution criteria is satisfied, then another check may be carried out to verify availability of other nodes, as indicated by step 410. In one embodiment, the other nodes may include the subset of available nodes selected from available nodes at step 204 of FIG. 2. The availability of the other nodes, for example, may be dependent on a processing capability of the other nodes, present status of the other nodes, distance of the other nodes from the base node, network throughput of the other nodes, range of the other nodes, and the like. In one embodiment, the check at step 410 to determine availability of the other nodes may be carried out by the base node.

Moreover, at step 410, if it is determined that the other nodes are not available, then the control may be transferred to step 412, where the computational task may be processed to determine the solution by a node in the plurality of nodes. In one embodiment, the computational task may be processed by the base node. In another embodiment, the computational task may be transferred to a node in the plurality of nodes for processing, thereby resulting in determination of the solution However, at step 410, if it is determined that the other nodes are available, then the control is transferred to step 414, where the computational task may be divided into a plurality of sub-tasks, such as, the plurality sub-tasks 302 (see FIG. 3). As previously noted with reference to FIG. 2, in one embodiment, the computational task may be divided into the plurality of sub-tasks by the base node. The base node may include a peer device, such as, any one of the cars 104, 106, 108, 110, the laptop 112, the mobile 114 and the personal digital assistant (PDA) 116 (see FIG. 1). It may be noted that hereinafter the terms "other nodes that are available" and "available nodes" may be used interchangeably.

Furthermore, at step 416, the plurality of sub-tasks may be distributed to the available nodes. Consequent to the distribution of the plurality of sub-tasks at step 416, the plurality of sub-tasks may be processed by the corresponding available nodes. Accordingly, at step 418, the plurality of sub-tasks may be processed to determine sub-solutions corresponding to the plurality of sub-tasks.

Moreover, at step 420, the sub-solutions corresponding to the plurality of sub-tasks may be received. As previously noted, the sub-solutions may be received by the base node. The sub-solutions, for example, may be received as described with reference to step 212 of FIG. 2 and steps 306-320 of FIG. 3.

Additionally, at step 422, the sub-solutions may be reassembled. As previously noted, the sub-solutions may be reassembled in a determined order or using a determined process. The determined order and/or the determined process, for example, may be dependent on the nature of the computational task. Consequent to the processing of step 422, the solution 216 to the computational task may be determined.

The method and system for processing a computational task described hereinabove enables creation of services that are beyond individual computing power of the telematics devices. By drawing on the pool of peer resources, processor and memory-intensive tasks that traditionally were confined to client server applications, the sub-tasks may now be developed on a network model. As the number of telematics devices increases in the network, the power of each individual telematics device increases with the ability to perform distributed computation.

EXAMPLE

For illustrative purposes, one non-limiting example is provided to show certain functionality of the present system.

This example relates to a computational task related to recognition of one or more speakers of an audio file. The audio file is received by a telematics device $T_1$. Accordingly, the telematics device $T_1$ is representative of a base node. In this example, the telematics device $T_1$ is connected to a network having ten other telematics devices including $T_2, T_3, T_4, T_5, T_6, T_7, T_8, T_9, T_{10}, T_{11}$. The telematics device $T_1$ after analyzing its processing capabilities and nature of the computational task decides to divide and distribute the computational task among two or more telematics devices. The telematics device $T_1$ then selects a subset of available telematics devices from the telematics devices $T_1, T_2, T_3, T_4, T_5, T_6, T_7, T_8, T_9, T_{10}, T_{11}$ based upon a present status, processing capability, distance, network throughput, range, resources, features, or combinations thereof of the telematics devices $T_1, T_2, T_3, T_4, T_5, T_6, T_7, T_8, T_9, T_{10}, T_{11}$. In this example, the telematics device (base node) $T_1$ selects telematics devices $T_1, T_2, T_4, T_5$, and $T_6$ to be representative of the subset of available telematics devices.

Following the selection of the subset of available telematics devices $T_1, T_2, T_4, T_5$, and $T_6$, the telematics device $T_1$ divides the computational task into five sub-tasks $ST_1, ST_2, ST_3, ST_4$ and $ST_5$. The telematics device $T_1$ then distributes the sub-tasks $ST_1, ST_2, ST_3, ST_4$ and $ST_5$ among the telematics devices $T_1, T_2, T_4, T_5$, and $T_6$ based upon the number of the telematics devices in the subset of available telematics devices $T_1, T_2, T_4, T_5$, and $T_6$, completion time period allowed for the sub-tasks $ST_1, ST_2, ST_3, ST_4$ and $ST_5$, the distribution criteria, level of security required for the completion of the sub-tasks $ST_1, ST_2, ST_3, ST_4$ and $ST_5$, resources available with the subset of available telematics devices $T_1, T_2, T_4, T_5$, and $T_6$, processing capability of the subset of available telematics devices $T_1, T_2, T_4, T_5$, and $T_6$, range of the subset of available telematics devices $T_1, T_2, T_4, T_5$, and $T_6$, features in the subset of available telematics devices $T_1, T_2, T_4, T_5$, and $T_6$, reliability of the subset of available telematics devices $T_1, T_2, T_4, T_5$, and $T_6$, trust in the the subset of available telematics devices $T_1, T_2, T_4, T_5$, and $T_6$, the current load on the subset of available telematics devices $T_1, T_2, T_4, T_5$, and $T_6$, domain of the sub-tasks $ST_1, ST_2, ST_3, ST_4$ and $ST_5$, or combinations thereof. The telematics device $T_1$ also sends one or more profiles of speakers of interest to the telematics devices $T_2, T_4, T_5$, and $T_6$.

In the present example, based upon the abovementioned criteria, the sub-tasks $ST_1, ST_2, ST_3, ST_4$ and $ST_5$ are divided among the subset of available telematics devices $T_1, T_2, T_4, T_5$, and $T_6$ as shown in Table 1.

TABLE 1

| Telematics device | Sub-tasks |
|---|---|
| $T_1$ | $ST_2$ |
| $T_2$ | $ST_4$ |
| $T_4$ | $ST_5$ |
| $T_5$ | $ST_3$ |
| $T_6$ | $ST_1$ |

Further, in the present example, the telematics device $T_1$ waits for a desired time period for sub-solutions from the telematics devices $T_1$, $T_2$, $T_4$, $T_5$, and $T_6$. In the meantime, the telematics devices $T_1$, $T_2$, $T_4$, $T_5$, and $T_6$ process the sub-tasks followed by comparison of their corresponding sub-tasks against one or more profiles of speakers of interest received from the telematics device $T_1$. The telematics devices $T_1$, $T_2$, $T_4$, $T_5$, and $T_6$ then communicate the sub-solutions corresponding to the sub-tasks $ST_1$, $ST_2$, $ST_3$, $ST_4$ and $ST_5$ within the desired time period along with the profiles of one or more speakers identified in their corresponding sub-tasks.

In the present example, the telematics device $T_1$ receives sub-solutions corresponding to the sub-tasks $ST_1$, $ST_2$, $ST_3$, $ST_4$ and $ST_5$ in the desired time period along with the profiles of the one or more speakers identified in their corresponding sub-tasks. The telematics device $T_1$ then reassembles the sub-solutions to determine speaker or speakers of the audio file. More particularly, the base node, the telematics device $T_1$, may be configured to reassemble the sub-solutions in a determined order or using a determined process to obtain a desired solution, namely, identify the speaker or speakers of the audio file.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for processing a computational task, comprising:
   a plurality of nodes operationally coupled to one another via one or more networks, the plurality of nodes, comprising:
   a base node comprising a processing subsystem configured to:
      receive the computational task;
      determine nodes that are available from the plurality of nodes based on receipt of response to a query signal broadcasted to the plurality of nodes via at least one of one or more communication modes available in the one or more networks;
      select a subset of available nodes from nodes available in the plurality of nodes based on information present in the response to the query signal, wherein the information comprises a present status, processing capability, distance from the base node, network throughput, range, resources, features, or combinations thereof;
      divide the computational task into a plurality of sub-tasks;
      distribute one or more of the plurality of sub-tasks for processing among the subset of available nodes using one of the one or more communication modes based on cost of using each of the one or more communication modes, and at least one of a number of nodes in the subset of available nodes, completion time period allowed for each of the plurality of sub-tasks, a distribution criteria, level of security required for the completion of the plurality of sub-tasks by the computational task, resources available with each of the subset of available nodes, processing capability of each of the subset of available nodes, reliability of the subset of available nodes, trust of the base node in the subset of available nodes, the current load on the subset of available nodes, or combinations thereof;
      receive sub-solutions corresponding to the plurality of sub-tasks generated at the subset of available nodes within a desired time period;
      verify receipt of the received sub-solutions within the desired time period to determine existence of one or more unprocessed sub-tasks from the plurality of sub-tasks;
      redistribute the one or more unprocessed sub-tasks, to generate sub-solutions, to new nodes from the nodes that are available in the plurality of nodes;
      receive sub-solutions corresponding to the one or more unprocessed sub-tasks within the desired time period; and
      reassemble the sub-solutions to determine a solution corresponding to the computational task.

2. The system of claim 1, wherein the subset of available nodes is further configured to communicate the sub-solutions corresponding to the one or more of the plurality of sub-tasks to the base node.

3. The system of claim 1, wherein the new nodes are further configured to communicate the sub-solutions corresponding to the one or more unprocessed sub-tasks to the base node.

4. The system of claim 1, wherein the one or more networks comprises a satellite network, a cellular network, a local area network, a wide area network, a private network, a wired network, a wireless network, or combinations thereof.

5. The system of claim 1, wherein the distribution criteria comprises completion time required for the computational task, criticality of the computational task, the importance rating of the computational task, expected number of resources required for processing of the computational task, or combinations thereof.

6. The system of claim 1, wherein the communication modes comprise Bluetooth, a Global System for Mobile Communications method (GSM), a General Packet Radio Service method (GPRS), a Worldwide Interoperability for Microwave Access method (Wi-Max), Wi-Fi, 802.15.4 (Zigbee or similar), or combinations thereof.

7. The system of claim 1, wherein the plurality of nodes comprises peer devices, non-peer devices, or both.

8. The system of claim 1, wherein the processing subsystem is further configured to generate and maintain a list of the subset of available nodes.

9. The system of claim 8, wherein the list comprises details pertaining to mapping of the plurality of sub-tasks against their respective nodes from the subset of available nodes.

10. The system of claim 1, wherein the processing subsystem is configured to distribute a sub-task of the plurality of sub-tasks to multiple nodes of the subset of available nodes.

11. The system of claim 1, wherein the processing subsystem is further configured to distribute multiple sub-tasks of the plurality of sub-tasks to one node of the subset of available nodes.

12. The system of claim 1, wherein the plurality of nodes and the subset of available nodes comprise telematics devices, non-telematics devices, peer devices, non-peer devices, or combinations thereof.

13. A system for processing a computational task, comprising:
   a plurality of telematics devices operationally coupled to one another via one or more networks, the plurality of telematics devices, comprising:
   a base node comprising a processing subsystem configured to:
      receive the computational task;
      determine telematics devices that are available from the plurality of telematics devices based on a response to query signals broadcasted to the plurality of telematics devices via at least one of one or more communication modes available in the one or more networks;
select a subset of available telematics devices from telematics devices available in the plurality of telematics devices based on information present in the response to the query signal, wherein the information comprises a present status, processing capability, distance from the base node, network throughput, range, resources, features, or combinations thereof of the plurality of telematics devices;
divide the computational task into a plurality of sub-tasks;
distribute one or more of the plurality of sub-tasks for processing among the subset of available telematics devices using one of the one or more communication modes based on cost of using each of the one or more communication modes, and at least one of a number of telematics devices in the subset of available telematics devices, completion time period allowed for each of the plurality of sub-tasks, a distribution criteria, level of security required for the completion of the plurality of sub-tasks by the computational task, resources available with each of the subset of available telematics devices, processing capability of the subset of available telematics devices, communication range of the subset of available telematics devices, reliability of the subset of available telematics devices, trust of the base node in the subset of available telematics devices, current load on the subset of available telematics devices, or combinations thereof;
receive sub-solutions corresponding to the plurality of sub-tasks generated at the subset of available telematics devices within a desired time period;
verify receipt of the sub-solutions within the desired time period to determine existence of one or more unprocessed sub-tasks from the plurality of sub-tasks;
redistribute the one or more unprocessed sub-tasks, to generate sub-solutions, to new nodes from nodes that are available in the plurality of nodes;
receive sub-solutions corresponding to the one or more unprocessed sub-tasks within the desired time period; and
reassemble the sub-solutions to determine a solution corresponding to the computational task.

14. A method for processing a computational task received at a base node, comprising:
broadcasting query signals to a plurality of nodes via one or more communication modes to determine nodes that are available;
selecting a subset of available nodes from the nodes available in the plurality of nodes by determining, from information in a response to the query signal, a present status, processing capability, distance from the base node, network throughput, range, resources, and combinations thereof of the plurality of nodes;
dividing the computational task into a plurality of sub-tasks;
distributing one or more of the plurality of sub-tasks for processing among the subset of available nodes using one of the one more communication modes based on cost of using each of the one or more communication modes, and at least one of a number of nodes in the subset of available nodes, completion time period allowed for each of the plurality of sub-tasks, a distribution criteria, level of security required for the completion of the plurality of sub-tasks by the computational task, resources available with each of the subset of available nodes, processing capability of each of the subset of available nodes, reliability of the subset of available nodes, trust of the base node in the subset of available nodes, current load on the subset of available nodes, or combinations thereof;
receiving sub-solutions corresponding to the plurality of sub-tasks generated at the subset of available nodes within a desired time period;
verifying receipt of the sub-solutions within the desired time period to determine existence of one or more unprocessed sub-tasks from the plurality of sub-tasks;
redistributing the one or more unprocessed sub-tasks, to generate sub-solutions, to new nodes from nodes that are available in the plurality of nodes;
receiving sub-solutions corresponding to the one or more unprocessed sub-tasks within the desired time period; and
reassembling the sub-solutions to determine a solution corresponding to the computational task.

15. The method of claim 14, further comprising communicating the sub-solutions corresponding to the one or more of the plurality of sub-tasks by the one or more of the subset of available nodes to the base node.

16. The method of claim 14, further comprising generating and maintaining a list of the subset of available nodes.

17. The method of claim 16, wherein generating and maintaining the list comprises maintaining details pertaining to mapping of the plurality of sub-tasks against their respective nodes from the subset of available nodes.

18. The method of claim 14, wherein the plurality of nodes comprises telematics devices, non-telematics devices, peer devices, non-peer devices, or combinations thereof.

19. A method for processing a computational task received at a base node from a plurality of nodes, comprising:
determining nodes that are available from the plurality of nodes based on a response to a query signal broadcasted by the base node to the plurality of nodes via one or more communication modes;
selecting a subset of available nodes from nodes that are available in the plurality of nodes, based on information from the response to the query signal;
dividing the computational task into a plurality of sub-tasks;
distributing one or more of the plurality of sub-tasks for processing among the subset of available nodes using one of the one or more communication modes one of the based on cost of using each of the one or more communication modes, and at least one of a number of nodes in the subset of available nodes, completion time period allowed for each of the plurality of sub-tasks, a distribution criteria, level of security required for the completion of the plurality of sub-tasks by the computational task, resources available with each of the subset of available nodes, processing capability of each of the subset of available nodes, reliability of the subset of available nodes, trust of the base node in the subset of available nodes, current load on the subset of available nodes, or combinations thereof;

receiving sub-solutions of one or more of the plurality of sub-tasks generated at one or more of the subset of available nodes within a desired time period;

verifying receipt of sub-solutions within the desired time period to determine existence of one or more unprocessed sub-tasks from the plurality of sub-tasks;

redistributing the one or more unprocessed sub-tasks, to generate sub-solutions, to new nodes from nodes that are available in the plurality of nodes;

receiving sub-solutions corresponding to the one or more unprocessed sub-tasks within the desired time period; and reassembling the sub-solutions to determine a solution corresponding to the computational task.

* * * * *